United States Patent [19]

Keaveney et al.

[11] Patent Number: 5,114,479

[45] Date of Patent: May 19, 1992

[54] DYE-LATEX COMBINATIONS AND USE IN AQUEOUS INKS

[75] Inventors: William P. Keaveney, Pompton Plains; Reinhard J. Sappok, Montclair, both of N.J.

[73] Assignee: BASF Corporation, Parsippany, N.J.

[21] Appl. No.: 546,115

[22] Filed: Jun. 29, 1990

[51] Int. Cl.⁵ .................. C09D 11/08; C09D 11/02; C08L 9/10

[52] U.S. Cl. ........................ 106/30; 106/20; 524/460

[58] Field of Search ............... 8/558; 106/23, 27, 20, 106/30; 524/460

[56] References Cited

U.S. PATENT DOCUMENTS

| | | | |
|---|---|---|---|
| 4,111,878 | 9/1978 | Ruhf | 106/30 |
| 4,148,944 | 4/1979 | Ruhf | 106/30 |
| 4,246,154 | 1/1981 | Yao | 524/88 |
| 4,248,746 | 2/1981 | Greiner | 106/30 |
| 4,309,179 | 1/1982 | Heuser et al. | 8/558 |
| 4,469,826 | 9/1984 | Carlick et al. | 106/30 |
| 4,612,343 | 9/1986 | Okuzono et al. | 524/547 |
| 4,692,188 | 9/1987 | Ober et al. | 106/23 |
| 4,820,762 | 4/1989 | Tsaur | 524/460 |

Primary Examiner—William R. Dixon, Jr.
Assistant Examiner—Helene Klemanski
Attorney, Agent, or Firm—Michael R. Chipaloski

[57] ABSTRACT

An aqueous ink composition of an oil-soluble dye in a latex is disclosed. The oil-soluble dye is dispersed in a fortified latex comprising a blend of a distinct dispersed phase in a distinct soluble polymer phase. The soluble polymer generally has a weight-average molecular weight of about 5,000 to about 20,000 and an acid number of about 50 to 400. These novel ink compositions have been found to be especially useful in gravure and flexographic ink applications.

5 Claims, No Drawings

DYE-LATEX COMBINATIONS AND USE IN AQUEOUS INKS

FIELD OF THE INVENTION

The present invention relates to novel dye/latex mixtures. Oil-soluble dyestuffs have been found to be compatible with fortified latices of the type used as vehicles in conventional aqueous printing inks.

BACKGROUND OF THE INVENTION

Novel dye-latex mixtures are disclosed in the present invention. Selected oil-soluble dyestuffs have been found compatible with fortified latices.

Several U.S. and foreign patents and published applications are related to the present invention. Below is a discussion of the most closely related publications presently known to the inventors.

U.S. Pat. No. 4,246,154: Hydrophobic dyes are pre-dissolved in organic solvent and are then used to impregnate a water-insoluble vinyl polymer finely dispersed in an aqueous medium. The resulting ink compositions are used for ink]et recording.

U.S. Pat. No. 4,612,343: Emulsions of polymers containing low levels of phosphoric acid groups or their salts are dyed with basic dyes, giving colored compositions which can be utilized as aqueous inks.

U.S. Pat. No. 4,692,188: Emulsifying an aqueous surfactant with a blend of a polymer plus an oil-soluble dye dissolved in a water-immiscible solvent, and subsequently evaporating the solvent, results in an inkjet composition with the dye trapped in the polymer particles suspended in the aqueous phase.

U.S. Pat. No. 4,783,220: Vesicles generated by shearing an aqueous suspension of an amphiphilic surfactant are colored by lipid-soluble dyes, giving compositions useful in flexography and gravure printing, as well as in inkjet printing.

Europ. Appl. 303,803-A2: An organic solution comprising an epoxy resin, a surfactant, a water-insoluble dye, and alternately an epoxy curing agent, is then dispersed in water via high speed mixing and the solvent subsequently removed by distillation. The resulting fine colored aqueous dispersions are recommended for thermosetting printing inks.

SUMMARY OF THE INVENTION

Oil-soluble dyestuffs have been found to be compatible with fortified latices of the type used as vehicles in conventional pigmented aqueous printing inks. Such dye/latex combinations, which do not require the use of high-energy dispersion equipment or heavy metal-containing colorants, produce intensely colored, stable emulsions. Drawdowns on glass yield transparent films of high color strength. When proofed on uncoated paper stock, prints of good color and gloss result. These new compositions have utility as gravure and flexographic inks for newsprint (publication) and corrugated (packaging) applications.

DETAILED DESCRIPTION OF THE INVENTION

The present invention relates to an aqueous ink composition comprising an oil-soluble dye in a latex, said latex comprising a blend of a distinct dispersed polymer phase in a distinct soluble polymer phase. The soluble polymer generally has a weight-average molecular weight of about 5,000 to about 20,000 and an acid number of about 50 to 400.

Oil-soluble dyestuffs have been found to be compatible with fortified latices of the type used as vehicles in pigmented aqueous printing inks. Such dye/latex combinations, which do not require the use of high-energy dispersion equipment or heavy metal-containing colorants, produce intensely colored, stable emulsions. Drawdowns on glass yield transparent films of high color strength. When proofed on uncoated paper stock, prints of good color and gloss result. These new compositions have use in gravure and flexographic inks for newsprint (publication) and corrugated (packaging) applications.

A fortified latex, as used herein, preferably comprises a distinct dispersed vinyl-acrylic polymer phase in a distinct soluble vinyl-acrylic polymer phase, with the soluble polymer serving as the primary dispersant, and a non-ionic surfactant included as a co-dispersant. Fortified latex materials of this type are disclosed and claimed in continuation of application U.S. Pat. No. 677,662 filed Oct. 9, 1986. This application is incorporated herein by reference. The soluble polymer is prepared from an acidic monomer (generally acrylic or methacrylic acid) and one or more monomers selected from the classes of -olefins (generally styrene or substituted styrenes) and acrylate or methacrylate esters. This polymer is water-solubilized through neutralization with organic or inorganic bases, usually ammonia.

The dispersed polymer is comprised of the polymerization product of one or more monomers selected from the classes of -olefins and acrylate or methacrylate esters, preferably prepared in the presence of the soluble polymer described above.

Such fortified latices have previously been claimed by us as useful printing ink vehicles. These latices display, among other advantages, superior mechanical and thermal stability.

U.S. Pat. No. 4,820,762 (4/11/89, to S.C. Johnson & Son, Inc.) also describes the property advantages of such compositions compared to conventional emulsion polymers.

The non-ionic surfactants found to be useful are generally of low to moderate hydrophile-lipophile balance ("HLB"), and are selected on the basis of their stabilizing and defoaming properties. Examples of the surfactants found to be useful in the present invention are Igepal CO-977, an ethoxylated nonylphenol available from GAF Chemicals; Surfynol 104, and acetylenic diol commercially available from Air Products; and Pluronic L-61, a propylene oxide-ethylene oxide block copolymer available from BASF.

Oil-soluble dyestuffs found to be useful have generally been members of the class of solvent dyes, with some representatives of the basic and disperse dye classes.

A solvent dye can be defined by its solubility in an organic solvent or solvents. Of most interest for this application are those dyes having good solubility in toluene or xylene.

Disperse dyes are substantially water-insoluble dyes, having substantivity to one or more hydrophobic fibers when applied from aqueous dispersion.

Basic dyes are slightly water-soluble, moderately colored materials convertible to strong chromophores via interaction with acids or acidic polymers.

Illustrative examples of dyes that may be used in the present invention include, but are not limited to, Sudan Red 380, Sudan Blue 670, Baso Red 546, Baso Blue 688, Sudan Yellow 150, Baso Blue 645, Flexo Yellow 110, and Flexo Blue 630, all commercially available from BASF; Oil Red 235, commercially available from Passaic Color and Chemical; Morfast Yellow 101, commercially available from Morton; Nitro Fast Yellow B, commercially available from Sandoz; Macrolex Yellow 6G, commercially available from Mobay. Preferred dyes are those having good solubility in aromatic solvents.

It is believed that these lipophilic dyes selectively diffuse into the dispersed phase of the latex, assisted by the water-soluble dispersing resin. Isopycnic density gradient ultracentrifugation has shown that most of the dye resides in the dispersed phase, with lesser amounts associated with surfactant micelles and precipitated as "free" colorant. Particle-size analysis of a fortified latex with and without added dyes demonstrated no change in average particle size and size distribution upon inclusion of up to 15% colorant.

The procedure usually followed in preparing these colored dispersions is to heat 150 parts by weight of fortified latex (at 45% solids content) to 55°-65° C. and then add, with mechanical stirring, 6.5 parts of dye. The mixture is further heated to 90°-95° and held there for 2-3 hours. The excellent thermal stability of these fortified latices enables them to readily tolerate these elevated temperatures. After cooling to <40°, the dispersion is discharged through organdy. Depending on the particle size of the dye and its affinity for the latex, small amounts of undispersed colorant are occasionally recovered from the filter cloth.

When a "conventional" polystyrene latex (Styrofan 4900, commercially available from BASF) was used in place of a fortified latex, significantly poorer dispersions were obtained with two different dyes. When this conventional latex was supplemented with a soluble dispersing resin, the subsequent colored dispersion was slightly improved but still unsatisfactory. A fortified latex, as defined herein, appears necessary for maximum dye absorbtivity.

The heavy-metal pigments widely used in the printing industry are coming under increasing regulatory restraint. The 100%-organic colorants used in this invention eliminate need for concern in this area. Also, printing ink compositions utilizing pigments require the use of high-energy dispersing equipment. The inks of the present invention need only simple standard-speed rotary mixing of the type normally used in chemical processing.

Because the dyes used in this invention are essentially insoluble in water, the resultant prints are completely bleed-resistant when immersed in water. Lightfastness here is generally deficient to that of analogous pigmented inks. There is a wide range of lightfastness available with these dyes, however, and in the best cases the fade resistance is acceptable for most applications.

DESCRIPTION OF THE PREFERRED EMBODIMENTS

The following examples are provided to illustrate the invention.

EXAMPLE I

Typical Fortified Latex Preparation

A) Preparation of Soluble Resin

To a nitrogen-blanketed, well-stirred reactor containing 300 grams of methyl isobutyl ketone (MIBK) at reflux, was added simultaneously over three hours, (a) 209g styrene, 100.3g ethyl acrylate, 108.7g acrylic acid, and 45g MIBK, and (b) 48.6g tert-butyl peroctoate and 50g MIBK. Fifteen minutes later, a solution of 1.6g t-butyl peroctoate and 23g MIBK was added to assure complete monomer conversion. Forty-five minutes later, the apparatus was modified for distillation. Thereafter, the polymer solution was subjected to solvent distillation until batch viscosity started to become unwieldy; 289g distillate was removed during this stage. Next was started dropwise addition of a solution of 97g ammonium hydroxide (29%) in 917g water. The resultant clear solution was then azeotropically distilled, returning the water layer until the batch temperature reached 95°. When the batch temperature exceeded 98° and practically no more organic layer was collecting, distillation was halted. Eleven grams of ammonium hydroxide was added as the vehicle cooled.

Yield: 1400 grams.
pH 8.05. TNV, 31.2%.
Viscosity, 200 poise (25%). Molecular weight (by GPC): Mw6500, Mn3210.

B) Preparation of Fortified Latex

A nitrogen-blanketed reactor was charged with 224.85 grams of the above product, 140.4g deionized water, 19.55g Pluronic L-61, and one gram of sodium bicarbonate. The mixture was stirred and heated to 80°-82° and treated with a solution of 0.75g ammonium persulfate in 14.25g water. Five minutes later, the addition of 160.9g styrene was begun and continued at a steady rate over four hours at 80°-84°. A solution of 0.25g ammonium persulfate in 4.75g water was added at this point, followed by a similar charge ninety minutes later. Heating was discontinued three hours after the end of monomer addition, and the dispersion cooled to 30°-35° and discharged through organdy. This filtration was very rapid, leaving behind virtually no coagulum.

Yield: 565.5g.
pH 8.23.
TNV, 44.25%.
Viscosity, 2.1 poise (25%).
Average particle size (Coulter N4), 82.5nm.

EXAMPLE II

Using conventional laboratory glassware, 152.5 grams of the latex prepared in Example I was stirred and heated under nitrogen, and 6.5g Oil Red 235 (Solvent Red 27) was added at 60°. The well-stirred mixture was further heated to 90°-95° and kept at this temperature for another two hours. After cooling down to around 35°-40°, the dispersion was discharged through organdy. The flask and filter were rinsed into the filtrate with 5g water. About 0.5g dye remained on the filter. Recovery of the deep red dispersion was 158.35g.

TNV, 46.6%.
Viscosity, 8 poise (25°).

This product was diluted with deionized water until a viscosity of 17.4 seconds in a Shell no. 2 cup was attained. This dilution required approximately 44g water/100g product. Evaluation of this diluted dispersion showed it to be a very good shade match for GCMI Red 76, and for a standard pigmented aqueous ink, although about 5-10 percent weaker than the latter. Immersion of a print of this dispersion on coated stock in water showed absolutely no bleeding of color. Lightfastness testing in a carbon arc Fade-o-meter test (40%

R.H., 145° F.) showed reasonable fade resistance, equivalent to a loss of about 3.0% chroma in eight hours.

EXAMPLE III

Styrofan 4900 (BASF) is a 50%-solids polystyrene emulsion in water, with a pH of 8.5 and an average particle size of 140nm. As 150 grams of this latex was heated and stirred with 7.1g Oil Red 235, dye absorption appeared much less efficient than in Example II. Even at 80°-85° (slightly lower temperatures were used here, to prevent coagulation), the slurry remained heterogeneous and weakly violet in color. After a couple of hours at this elevated temperature, the mixture was cooled and filtered through organdy. About 6.2g solid remained on the filter, and the filtrate (145.95g) was still heterogeneous and weakly colored.

A variation of the above procedure was attempted, in which a blend of 85g Styrofan 4900 and 70g Joncryl 584 (a 30% solution of Joncryl 678 in ammoniacal water) was mixed with 6.5g Oil Red 235. Color build was minimal, even during two hours at 90°-93°. Subsequent filtration removed only 0.6g solid, but the filtrate (168g) was heterogeneous and much less intensely colored than the product of Example II.

EXAMPLE IV

A fortified latex was prepared as in Example I, using a 74 methyl methacrylate/26 acrylic acid copolymer as the soluble resin and a copolymer of 57.3 parts of 2-ethylhexyl acrylate and 42.7 parts of methyl methacrylate as the dispersed phase. The resulting product had a pH of 8.95 and a Brookfield viscosity of 11.6 poise (50 rpm) at 48.25% TNV. One hundred forty grams of this dispersion was diluted with ten grams of water, and treated with 7.5g Flexo Blue 630 (Basic Blue 55) in the same manner as in Example II. The resulting filtrate (virtually no residue remained behind on the organdy) comprised 164 grams. At 44.8% TNV, the viscosity was 58.7 poise (10 rpm), so 20g water was added to reduce the solids content to 40% and the viscosity to 10.4 poise (50 rpm). Even here, 98g water was required to reduce 100g of this product to 18 seconds, Shell 2 cup. Despite this extensive dilution, such that the final composition contained only 2.0% colorant, both drawdowns and prints on a proof press were stronger, glossier, and redder than a standard aqueous ink. The drawdowns showed no bleeding in water, but poor lightfastness, with considerable loss in strength after two hours in the Fade-o-meter.

EXAMPLE V 150g of the latex of Example I was treated over nine minutes at 52°-57° with 18.38g Morfast Yellow 101 (essentially a blend of 47 parts solvent, mostly n-propanol, and 53g parts Solvent Yellow 143). After continuing the process as in Example II, the resulting dispersion, which filtered readily through organdy, comprised 170.27g.

TNV, 45.12%.

Viscosity, 4.6 poise (100 rpm).

Fifty grams of water was required to reduce 100g of this dispersion to print viscosity (18 sec., Shell 2). Both drawdowns and press proofs were slightly weaker and greener, but generally satisfactory. Lightfastness was marginally acceptable, with approximately 7% loss of strength in four hours and 15.5% loss in eight hours.

We claim:

1. An aqueous ink composition comprising an oil-soluble dye selected from the group consisting of solvent dyes, dispersed dyes and basic dyes dispersed in a fortified latex comprising a blend of a distinct dispersed polymer phase in a distinct soluble polymer phase.

2. The aqueous ink of claim 1 wherein the soluble polymer has a weight-average molecular weight of about 5,000 to about 20,000 and an acid number of about 50 to about 400.

3. The aqueous ink of claim 1 wherein the dispersed phase is prepared by emulsion polymerization.

4. The aqueous ink of claim 1 wherein the distinct dispersed phase is a vinyl-acrylic polymer.

5. The aqueous ink of claim 1 wherein the distinct soluble phase comprises at least one acidic monomer component.

* * * * *